(12) United States Patent
Sato et al.

(10) Patent No.: US 10,965,184 B2
(45) Date of Patent: Mar. 30, 2021

(54) ROTARY ELECTRIC MACHINE

(71) Applicant: Hitachi Industrial Products, Ltd., Tokyo (JP)

(72) Inventors: Misato Sato, Tokyo (JP); Takeshi Mori, Tokyo (JP); Kenichi Sugimoto, Tokyo (JP); Takayuki Koyama, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 107 days.

(21) Appl. No.: 16/180,615

(22) Filed: Nov. 5, 2018

(65) Prior Publication Data
US 2019/0199162 A1    Jun. 27, 2019

(30) Foreign Application Priority Data

Dec. 26, 2017 (JP) .............................. JP2017-248757

(51) Int. Cl.
| | |
|---|---|
| *H02K 5/20* | (2006.01) |
| *H02K 5/24* | (2006.01) |
| *H02K 9/18* | (2006.01) |
| *H02K 9/06* | (2006.01) |
| *H02K 9/12* | (2006.01) |

(52) U.S. Cl.
CPC .............. *H02K 5/24* (2013.01); *H02K 5/20* (2013.01); *H02K 9/06* (2013.01); *H02K 9/12* (2013.01); *H02K 9/18* (2013.01); *H02K 2205/09* (2013.01)

(58) Field of Classification Search
CPC .. H02K 5/20; H02K 9/06; H02K 9/12; H02K 9/18
See application file for complete search history.

(56) References Cited

U.S. PATENT DOCUMENTS

| | | | |
|---|---|---|---|
| 4,348,604 A * | 9/1982 | Thode .................... | H02K 9/18 165/166 |
| 2004/0222711 A1* | 11/2004 | Klimt .................... | H02K 9/18 310/59 |

FOREIGN PATENT DOCUMENTS

JP        2015-154583 A      8/2015

* cited by examiner

*Primary Examiner* — Ramon M Barrera
(74) *Attorney, Agent, or Firm* — Crowell & Moring LLP (57) ABSTRACT

A rotary electric machine of the present invention includes: a stator; a rotor placed on an inner diameter side of the stator through an air gap and fixed to a rotating shaft; a stator frame supporting the stator; a casing storing the stator and the rotor; an outer fan fixed to the rotating shaft; a heat exchanger installed above the casing for heat exchange between outside air taken through the outer fan and internal air to remove heat; and an outer fan duct installed on an end portion of the casing in an axial direction, provided with the outer fan in an inside of the outer fan duct, and formed with a ventilation path through which the outside air is delivered to the heat exchanger. A plate-shaped member has at least a curved surface portion. The plate-shaped member forms the ventilation path of the outer fan duct.

13 Claims, 4 Drawing Sheets

ROTARY ELECTRIC MACHINE

CLAIM OF PRIORITY

The present application claims priority from Japanese Patent application serial no. 2017-248757, filed on Dec. 26, 2017, the content of which is hereby incorporated by reference into this application.

BACKGROUND OF THE INVENTION

The present invention relates to a rotary electric machine, and to a rotary electric machine preferable for use as one including an outer fan duct installed on the end portion of a casing in the axial direction and provided with an outer fan taking outside air into the machine, like a blower motor, a pump motor, a compressor motor, and any other motor, for example.

Typically, a rotary electric machine includes a closed casing and an outer fan duct. The casing stores a stator and a rotor that configure the rotary electric machine. The outer fan duct is installed on the end portion of the casing in the axial direction. In the inside of the outer fan duct, an outer fan is provided. The outside air is taken into a heat exchanger through the outer fan, and heat is exchanged between the air circulating in the inside of the casing and the outside air to cool the rotary electric machine.

As a rotary electric machine including an outer fan duct installed with an outer fan that takes the outside air into the machine, Japanese Unexamined Patent Application Publication No. 2015-154583 discloses a rotary electric machine.

The rotary electric machine of Japanese Unexamined Patent Application Publication No. 2015-154583 includes an outer fan duct, a casing, and a heat exchanger. The casing stores a rotor and a stator. The outer fan duct includes an outer fan in its inside. The outer fan duct is placed adjacently at the end portion of the casing. In the outer fan duct, the outside air is taken from its outside air intake, and guided to the inlet opening of the heat exchanger tube of the heat exchanger. The outer fan duct has an outer fan duct lower member and an outer fan duct upper member. The outer fan duct lower member is formed with an outside air intake, and houses the outer fan. The outer fan duct upper member is attachably and detachably connected to the outer fan duct lower member immediately above, and attachably and detachably coupled to a first end portion of the casing.

SUMMARY OF THE INVENTION

However, in the rotary electric machine disclosed in Japanese Unexamined Patent Application Publication No. 2015-154583, when the air quantity of the outer fan is increased, vortices occur on the casing surface or winds blow on the casing surface, and this causes an increase in the surface vibrations of the outer fan duct. In consequence, noise sometimes occurs. Since the outer fan rotates in synchronization with the shaft of the rotary electric machine, an increase in the air quantity of the outer fan as described above means an increase in the number of revolutions of the rotary electric machine or an increase in the outer fan diameter. In the case, vibrations transmitted from the rotary electric machine to the outer fan duct are also increased.

In the rotary electric machine disclosed in Japanese Unexamined Patent Application Publication No. 2015-154583, the outer fan duct lower member and the outer fan duct upper member configuring the outer fan duct and a guide plate placed in the inside of the outer fan duct are formed of a flat plate. This prevents a smooth flow of the outside air. The outside air becomes stagnant especially at the connecting portion of the outer fan duct lower member to the outer fan duct upper member or at the bent portion of the guide plate; the flowing direction of the outside air is changed at these portions. Thus, the machine has a structure in which ventilation resistance is large in the admission of the outside air present in the inside of the outer fan duct into the heat exchanger.

The present invention has been made in the circumstances described above. An object of the present invention is to provide a rotary electric machine that of course decreases the surface vibrations of the outer fan duct to reduce noise caused by the vibrations and reduces ventilation resistance in the admission of the outside air present in the inside of the outer fan duct into the heat exchanger.

In order to achieve the object, a rotary electric machine according to an aspect of the present invention includes a stator, a rotor, a stator frame, a casing, an outer fan, a heat exchanger, and an outer fan duct. The rotor is placed on the inner diameter side of the stator through an air gap and fixed to a rotating shaft. The stator frame supports the stator. The casing stores the stator and the rotor. The outer fan is fixed to the rotating shaft. The heat exchanger is installed above the casing and configured to exchange heat between outside air taken from an outside through the outer fan and internal air having cooled the stator and the rotor to remove heat. The outer fan duct is installed on the end portion of the casing in an axial direction, provided with the outer fan in the inside of the outer fan duct, and formed with a ventilation path through which the outside air is delivered to the heat exchanger. In the rotary electric machine, a plate-shaped member has at least a curved surface portion at which the outside air is introduced into the heat exchanger, and the plate-shaped member forms the ventilation path of the outer fan duct.

In accordance with the aspect of the present invention, the surface vibrations of the outer fan duct are of course decreased to reduce noise possibly caused by the vibrations, and ventilation resistance in the admission of the outside air present in the inside of the outer fan duct into the heat exchanger is reduced.

DETAILED DESCRIPTION OF THE PREFERRED EMBODIMENTS

In the following, a rotary electric machine according to an embodiment of the present invention will be described based on embodiments shown in the drawings. Note that, in the embodiments, the same components are designated the same reference signs.

First Embodiment

Figure 1:
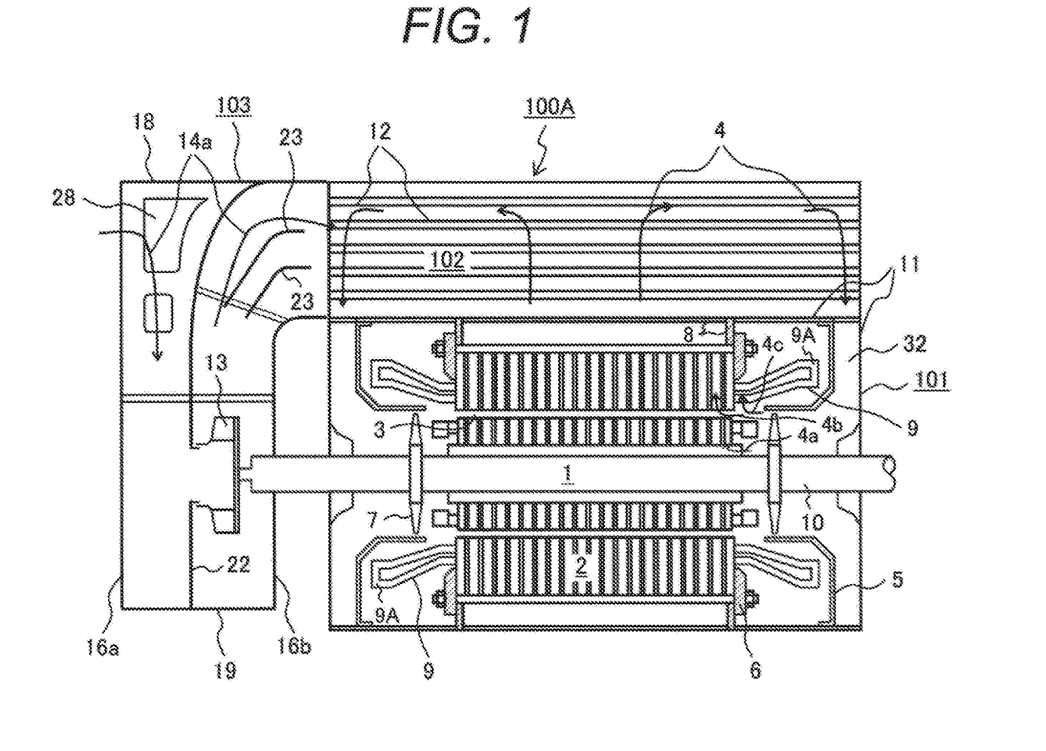
FIG. 1 is a cross sectional view of a first embodiment of a rotary electric machine according to an embodiment of the present invention.

FIG. 1 is a first embodiment of a rotary electric machine according to an embodiment of the present invention.

As shown in FIG. 1, a rotary electric machine 100A according to the embodiment is mainly configured of a rotary electric machine main body 101, a heat exchanger 102 that cools internal air 4 circulating in the inside of the rotary electric machine main body 101, and an outer fan duct 103 that takes outside air into the heat exchanger 102.

The rotary electric machine main body 101 includes a stator 2, a rotor 1 placed on the inner diameter side of the stator 2, the rotor 1 facing the stator 2 through an air gap 3, a stator frame 8 that supports the stator 2, a casing 11 that stores the stator 2 and the rotor 1, the heat exchanger 102 installed above the casing 11, the heat exchanger 102 being configured to exchange heat between outside air 14a taken from the outside through an outer fan 13, described later, and internal air 4 having cooled the stator 2 and the rotor 1 to remove heat, and an inner fan 7 installed on both ends of a rotating shaft 10 of the rotor 1, the inner fan 7 being configured to return the internal air 4 after its heat has been removed at the heat exchanger 102 to the inside of the machine (in the inside of the rotary electric machine main body 101).

The stator 2 includes a stator iron core 6, and a stator coil 9 housed in a plurality of slots (not shown) formed on the inner diameter side of the stator iron core 6. The stator coil 9 has a stator coil end portion 9A protruding from the end portion of the stator iron core 6 in the axial direction. A fan guide plate 5 is provided so as to cover the stator coil end portion 9A.

The internal air 4 after its heat has been removed is diverted at the inner fan 7 to internal air 4a toward the inside of the rotor 1, to internal air 4b toward the air gap 3, and internal air 4c toward the stator coil end portion 9A.

The internal air 4a toward the inside of the rotor 1 cools the rotor 1, joints the internal air 4b toward the air gap 3 to cool the stator 2, and enters the inside of the stator frame 8. The internal air 4c toward the stator coil end portion 9A cools the stator coil end portion 9A, passes through the opening (not shown) of the stator frame 8 supporting the stator 1, enters the inside of the stator frame 8, and then joins the internal air 4a and the internal air 4b.

The internal air 4 having flowed from the outer circumferential surface of the stator frame 8 enters the heat exchanger 102 in which the heat of the internal air 4 is removed, passes through an internal ventilation passage 32 formed by the casing 11 and the fan guide plate 5, and returns to the inner fan 7.

The heat exchanger 102 includes a tube group 12 having a plurality of tubes placed in parallel with each other. The outside air 14a that is a secondary coolant circulates in the inside of the tube group 12 with the outer fan 13. The internal air 4 and the outside air 14a in the inside of the tubes are heat exchanged through the tube walls when the internal air 4 passes between the tubes of the tube group 12 in the inside of the heat exchanger 102.

Figure 2:
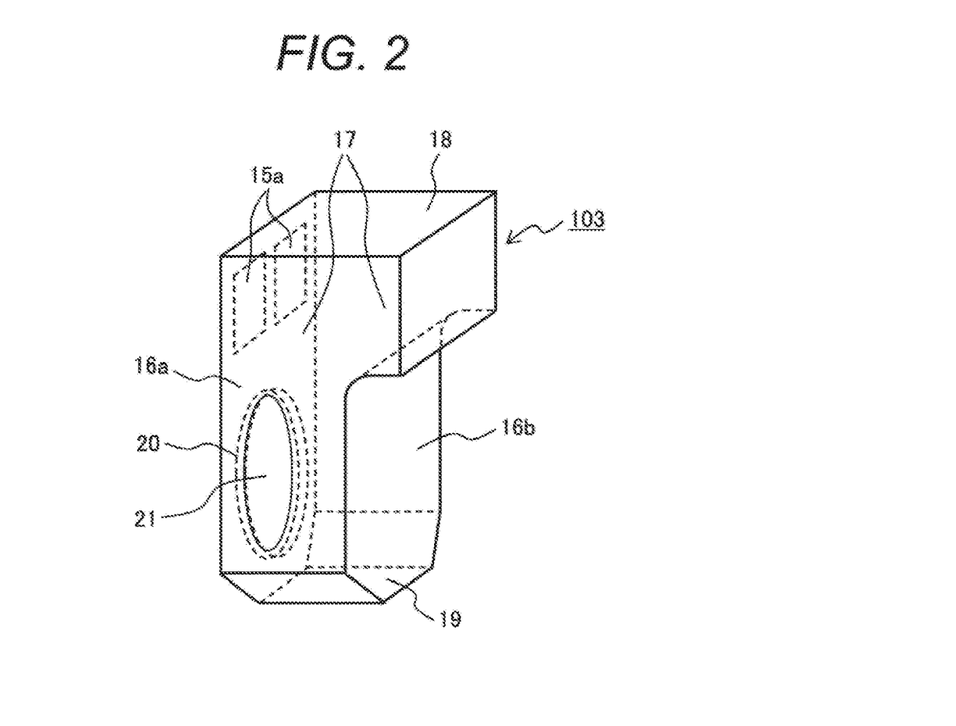
FIG. 2 is a perspective view of an outer fan duct adopted in the first embodiment of the rotary electric machine according to an embodiment of the present invention.

FIG. 2 shows the outer fan duct 103 having two ventilation paths according to the embodiment.

As shown in FIG. 2, the outer fan duct 103 according to the embodiment is configured of an outside air intake 15a, a first outer fan duct outer plate 16a, a second outer fan duct outer plate 16b, side plates 17, an upper plate 18, a lower plate 19, and an outer fan mounting part cover 20. The plates 16a, 16b, 17, 18, and 19 configure the outer shape of the outer fan duct 103. The first outer fan duct outer plate 16a has a circular outer fan mounting hole 21. In the structure, after the outer fan 13 is mounted, the outer fan mounting hole 21 is blocked with an outer fan mounting part cover 20, and then the cover 20 is fixed with bolts (not shown).

Figure 3A:
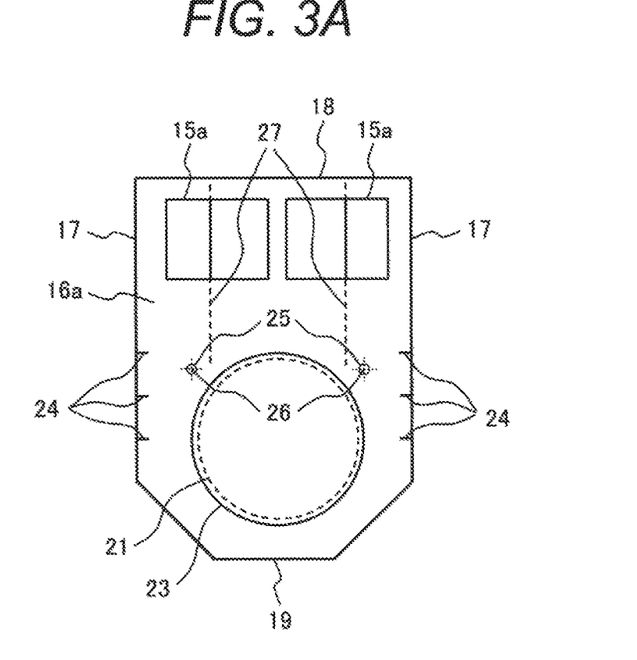
FIG. 3A is a front view of the outer fan duct adopted in the first embodiment of the rotary electric machine according to an embodiment of the present invention.
Figure 3B:
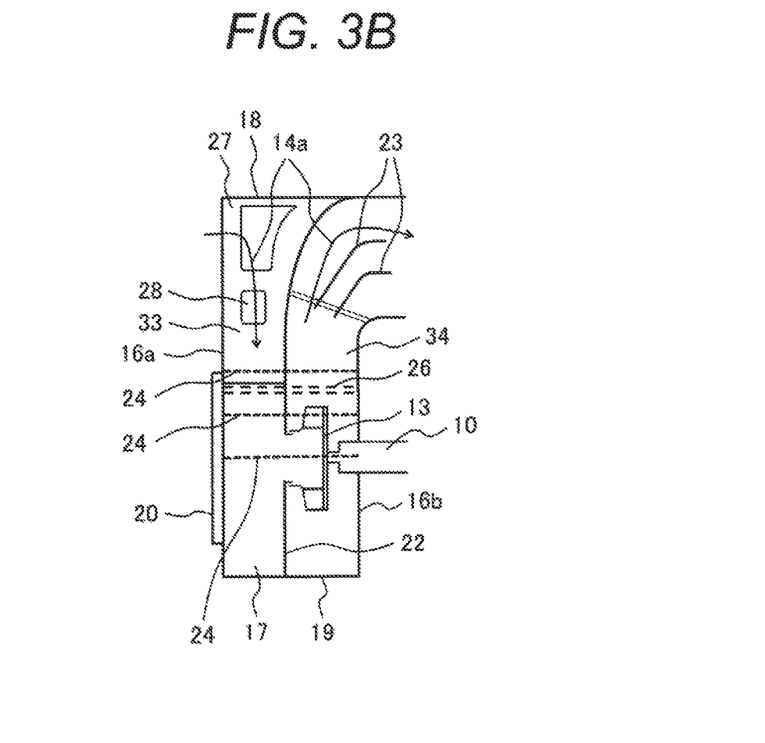
FIG. 3B is a side view of the outer fan duct in FIG. 3A.

FIG. 3A is a front view of the outer fan duct 103 according to the first embodiment. FIG. 3B is a side view of the duct 103 in FIG. 3A.

As shown in FIGS. 3A and 3B, the outer fan duct 103 having two ventilation paths is configured of a first ventilation path 33 located on the far side from the heat exchanger 102, and a second ventilation path 34 located on the near side to the heat exchanger 102. The second ventilation path 34 communicates with the first ventilation path 33. The first ventilation path 33 is partitioned from the second ventilation path 34 by an intermediate plate 22 having an opening. In the embodiment, the second ventilation path 34 has a curved surface portion at which the outside air 14a is introduced into the heat exchanger 102.

At the position in the second ventilation path 34 near to the heat exchanger 102, outside air introduction guide plates 23 are installed. The plates 23 guide the introduced outside air 14a. A part of the outside air introduction guide plates 23 is formed in a curved surface similarly to the second ventilation path 34.

The first ventilation path 33 includes the first outer fan duct outer plate 16a, the intermediate plate 22, the side plate 17 placed on the side surfaces between the first outer fan duct outer plate 16a and the intermediate plate 22, the upper plate 18 placed on the upper part of the plates 16a, 22, and 17, and the lower plate 19 placed on the lower part of the plates 16a, 22, and 17. The second ventilation path 34 includes the second outer fan duct outer plate 16b, the intermediate plate 22, the side plate 17 placed on the side surfaces between the second outer fan duct outer plate 16b and the intermediate plate 22, the upper plate 18 placed on the upper part of the plates 16b, 22, and 17, and the lower plate 19 placed on the lower part of the plates 16b, 22, and 17. The intermediate plate 22 and the second outer fan duct outer plate 16b have a curved surface portion at which the outside air 14a is introduced into the heat exchanger 102. The first outer fan duct outer plate 16a is formed with the outside air intake 15a into which the outside air 14a is taken.

That is, the first ventilation path 33 is configured of the first outer fan duct outer plate 16a, the intermediate plate 22, the upper plate 18, the lower plate 19, and the side plates 17. On the upper part of the first outer fan duct outer plate 16a, the outside air intake 15a is provided into which the outside air 14a is introduced. The second ventilation path 34 is provided on the heat exchanger 102 side of the first ventilation path 33 through the intermediate plate 22. The path 34 is configured of the second outer fan duct outer plate 16b, the intermediate plate 22, the upper plate 18, the lower plate 19, and the side plates 17.

The second ventilation path 34 communicates with the first ventilation path 33 through an opening provided on a part of the intermediate plate 22, and guides the outside air 14a from the second ventilation path 34 to the heat exchanger 102.

The intermediate plate 22, the second outer fan duct outer plate 16b, and the outside air introduction guide plates 23 have a curved surface portion at which the outside air 14a is introduced into the heat exchanger 102.

In the first ventilation path 33, plate-shaped beams 27 are installed on the space formed by the first outer fan duct outer plate 16a, the intermediate plate 22, the upper plate 18, and the side plates 17. On the plate-shaped beam 27, a ventilation hole 28 is formed. The outside air 14a flows in the inside of the first ventilation path 33 through the ventilation hole 28.

The rotating shaft 10 extends penetrating the wall at the end portion of the casing 11 on the outer fan duct 103 side and the second outer fan duct outer plate 16b of the outer fan duct 103. The outer fan 13 is connected to the tip end of the rotating shaft 10. The outer fan 13 is placed in the inside of the second ventilation path 34.

As described above, a structure is provided in which the outer fan 13 is housed in the inside of the outer fan duct 103, i.e. in the inside of the second ventilation path 34. Almost no fan sound of the outer fan 13 is directly leaked, because the first ventilation path 33 and the second ventilation path 34 are provided. Thus, a reduction in noise caused by the outer fan 13 is enabled.

In the embodiment, the cross section of the introduction portion, at which the outside air is introduced to the heat exchanger 102, is formed in a curved surface in the intermediate plate 22 and the second outer fan duct outer plate 16b. Further, as the cross section of the introduction portion of the outside air is formed in a curved surface in the intermediate plate 22 and the second outer fan duct outer plate 16b, the cross section of the outside air introduction guide plates 23 is also formed in a curved surface. Thus, stiffness is improved, and hence the vibrations of the intermediate plate 22 caused by the ventilation of the outer fan 13 are reduced, compared with the previously existing intermediate plate in which the introduction portion of the outside air 14a has a flat surface in the cross section.

The first outer fan duct outer plate 16a is joined to the intermediate plate 22 using the plate-shaped beam 27, and hence the stiffness is improved. The plate-shaped beam 27 has the ventilation hole 28. In the structure, the outside air 14a spatially uniformly flows without partitioning the outside air 14a by the plate-shaped beam 27.

With the structure according to the embodiment, stiffness is improved, and the vibrations of the intermediate plate 22 caused by the ventilation of the outer fan 13 are reduced, compared with the previously existing intermediate plate in which the introduction portion of the outside air 14a to the heat exchanger 102 has a flat surface in the cross section. Ventilation resistance at the introduction portion at which the outside air 14a is introduced into the tube group 12 of the heat exchanger 102 is decreased, and hence this enables more smooth guidance of the outside air 14a to the tube group 12.

In the embodiment, a beam 24 is provided on the side plate 17 located between the first outer fan duct outer plate 16a and the intermediate plate 22 and on the side plate 17 between the second outer fan duct 16b and the intermediate plate 22. The beam 24 includes a plurality of beams 24 provided at regular intervals from the height near the lower end of the plate-shaped beam 27 to downward. The beams 24 have a function of improving the stiffness of the lower part of the outer fan duct 103 where no plate-shaped beam 27 is placed.

Thus, this enables the improvement of the stiffness of the entire outer fan duct 103 and a reduction in vibrations on the surface of the outer fan duct 103.

In the previously existing structure, the stiffness is small at points 25 on the upper part of the outer fan duct 103 on the surface of the first outer fan duct outer plate 16a and on the surface of the second outer fan duct outer plate 16b. At the points 25 and on the surface of the plate 16b, vibrations caused by the ventilation of the outer fan duct 103 are increased.

As the measures against the vibrations, in the embodiment, the intermediate plate 22 where stiffness is improved is joined to the first outer fan duct outer plate 16a at the points 25 on the surface of the first outer fan duct outer plate 16a where stiffness is partially small, using a pipe-shaped beam 26 in a hollow structure. The intermediate plate 22 is further joined to the second outer fan duct outer plate 16b using the pipe-shaped beam 26. Thus, a structure is provided in which the stiffness at the points 25 on the surface of the first outer fan duct outer plate 16a and the stiffness of the surface of the second outer fan duct outer plate 16b are increased, and vibrations are reduced. Note that, a columnar beam may be used instead of the pipe-shaped beam 26 in a hollow structure.

Therefore, in accordance with the embodiment, a reduction in the surface vibrations of the outer fan duct 103 is of course enabled to reduce noise due to the vibrations as well as a reduction in ventilation resistance is enabled in the admission of the outside air present in the inside of the outer fan duct 103 to the heat exchanger 102.

Second Embodiment

Figure 4:
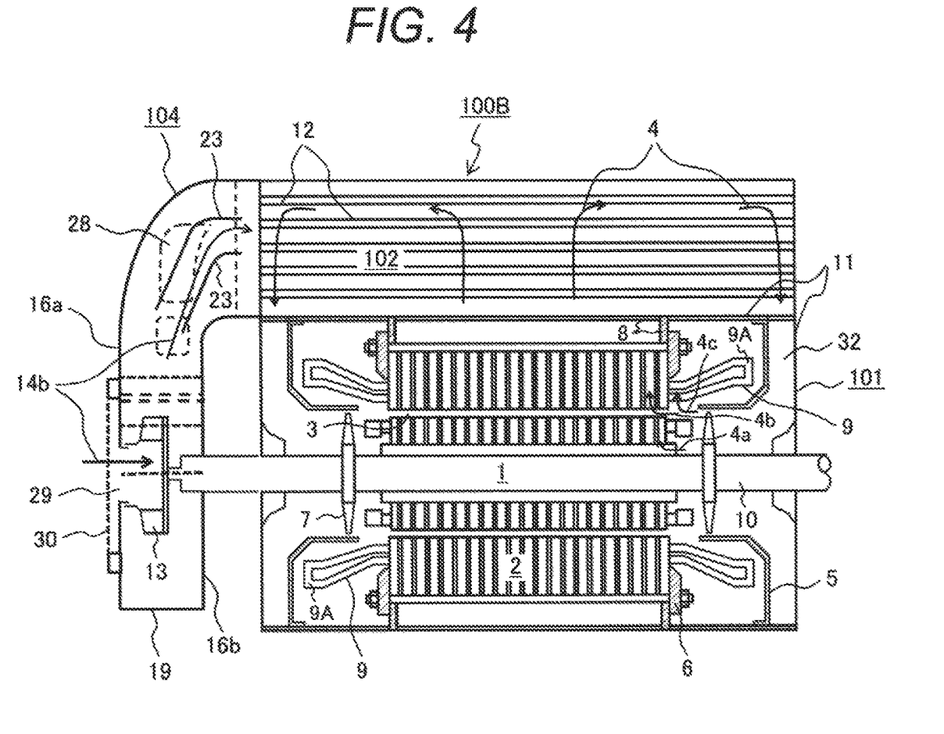
FIG. 4 is a cross sectional view of a second embodiment of a rotary electric machine according to an embodiment of the present invention.

FIG. 4 is a second embodiment of the rotary electric machine according to an embodiment of the present invention.

In a rotary electric machine 100B according to the embodiment shown in FIG. 4, the mechanisms of a rotary electric machine main body 101 and a heat exchanger 102 are similar to the mechanisms of the first embodiment. However, instead of the outer fan duct 103 having two ventilation paths according to the first embodiment, one outer fan duct 104 is mounted on the rotary electric machine 100B. The outer fan duct 104 has one ventilation path suitable for the air quantity generated by an outer fan 13 and a rotary electric machine having a small number of revolutions. The outside air is taken into the heat exchanger 102 along a passage like a flow of outside air 14b.

Figure 5:
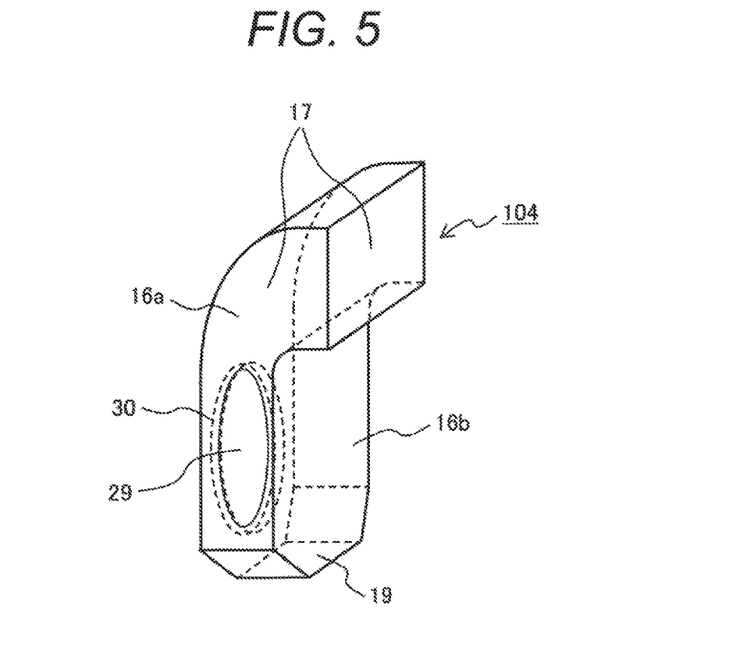
FIG. 5 is a perspective view of an outer fan duct adopted in the second embodiment of the rotary electric machine according to an embodiment of the present invention.

FIG. 5 shows the outer fan duct 104 having one ventilation path according to the embodiment.

As shown in FIG. 5, the outer fan duct 104 having one ventilation path according to the embodiment is configured of a first outer fan duct outer plate 16a located on the far side from the heat exchanger 102, a second outer fan duct outer plate 16b located on the near side to the heat exchanger 102, a side plate 17 placed on the side surfaces between the first and the second outer fan duct outer plates 16a and 16b, and a lower plate 19 placed on the lower part of the plates 16a, 16b, and 17, an outside air intake 29 formed on the first outer fan duct outer plate 16a, the intake 29 also serving as a mounting hole of the outer fan 13 to take in the outside air 14b, and an outside air intake net 30 covering the outside air intake 29, the net 30 having a net on its doughnut-shaped center part. The plates 16a, 16b, 17, and 19 configure the outer shape of the outer fan duct 104. Note that, the upper part of the first outer fan duct outer plate 16a also serves as an upper plate 18 of the first embodiment.

In the embodiment, the first and the second outer fan duct outer plates 16a and 16b and outside air introduction guide plates 23 have a curved surface portion at which the outside air 14b is introduced into the heat exchanger 102.

The first outer fan duct outer plate 16a is formed with the outside air intake 29. The outside air intake 29 also serves as the mounting hole of the outer fan 13. In the structure, after the outer fan 13 is installed, the outside air intake net 30 is fixed with bolts (not shown).

Figure 6A:
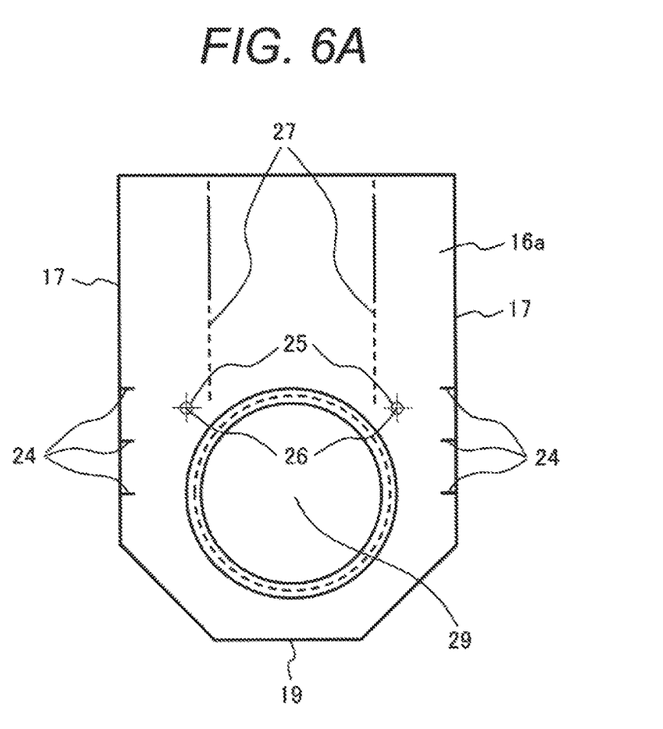
FIG. 6A is a front view of the outer fan duct adopted in the second embodiment of the rotary electric machine according to an embodiment of the present invention.
Figure 6B:
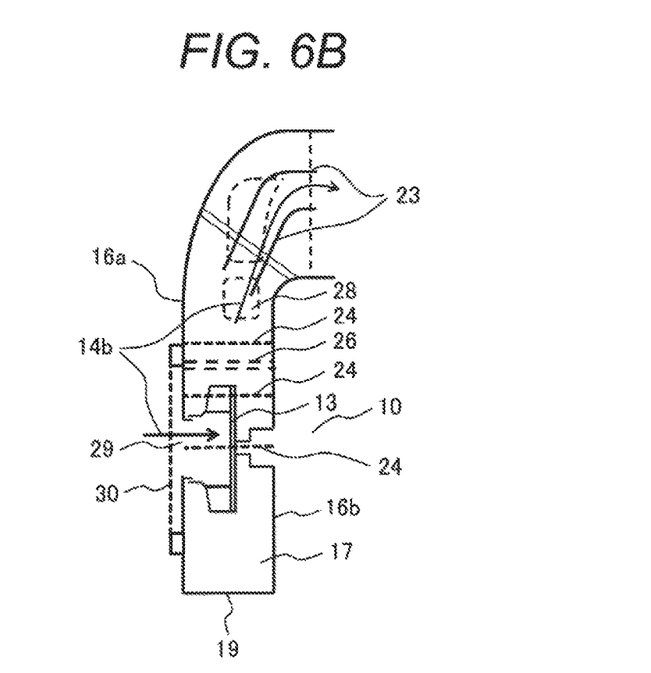
FIG. 6B is a side view of the outer fan duct in FIG. 6A.

FIG. 6A is a front view of the outer fan duct 104 according to the second embodiment. FIG. 6B is a side view of the duct 104 in FIG. 6A.

As shown in FIGS. 6A and 6B, in the outer fan duct 104 having one ventilation path, the first outer fan duct outer plate 16a and the outside air introduction guide plates 23 serve to introduce the outside air into the heat exchanger 102. As described above, the cross sections of the plates 16a and 23 are formed in a curved surface.

In the outer fan duct 104 according to the embodiment, the cross sections of the first outer fan duct outer plate 16a and the outside air introduction guide plates 23 are formed in a curved surface. Thus, this enables the improvement of the stiffness of the outer fan duct 104, and at the same time, this enables a reduction in ventilation resistance at the introduction portion of the outside air 14b into the tube group 12 of the heat exchanger 102, and a smooth guidance of the outside air 14b to the tube group 12.

Plate-shaped beams 27 are installed on the space (the ventilation path) formed by the first and the second outer fan duct outer plates 16a and 16b and the side plates 17. The first and the second outer fan duct outer plates 16a and 16b are joined to each other using the plate-shaped beams 27, and hence stiffness is improved. The plate-shaped beam 27 is formed with a ventilation hole 28. The outside air 14b flows in the inside of the ventilation path through the ventilation hole 28.

A beam 24 is provided on the side plates 17 located between the first and the second outer fan duct outer plates 16a and 16b. The beam 24 includes a plurality of beams 24 at regular intervals from the height near the lower end of the plate-shaped beam 27 to downward along the side plate 17. The beams 24 have a function of improving the stiffness of the lower part of the outer fan duct 104 where no plate-shaped beam 27 is placed.

Thus, this enables the improvement of the stiffness of the entire outer fan duct 104 and a reduction in vibrations on the surface of the outer fan duct 104.

In the previously existing structure, the stiffness is small at points 25 on the upper part of the outer fan duct 104 on the surface of the first outer fan duct outer plate 16a. At the points 25, vibrations caused by the ventilation of the outer fan duct 104 are increased.

As the measures against the vibrations, in the embodiment, the first and the second outer fan duct outer plates 16a and 16b where the stiffness is improved are joined to each other using the pipe-shaped beams 26 in a hollow structure at the points 25 on the surface of the first outer fan duct outer plate 16a where stiffness is partially small. Thus, a structure is provided in which the stiffness at the points 25 on the surface of the first outer fan duct outer plate 16a and the stiffness of the surface of the second outer fan duct outer plate 16b are increased, and vibrations are reduced. Note that, a columnar beam may be used instead of the pipe-shaped beam 26 in a hollow structure.

Therefore, in accordance with the embodiment, the effect similar to the first embodiment is obtained.

The structures according to the first and the second embodiments provide the outer fan ducts 103 and 104 with advantages that reduce the vibrations of the outer fan ducts 103 and 104, reduce noise in association with the reduction in the vibrations, and reduce ventilation resistance in the outer fan ducts 103 and 104.

With the selection of the first embodiment or the second embodiment suitable for the size of the air quantity generated by the outer fan 13 and the size of the number of revolutions of the rotary electric machine, the use of a rotary electric machine suitable for the application to products is enabled.

Note that, the present invention is not limited to the foregoing embodiments, and the present invention includes various modifications and alterations. For example, the foregoing embodiments are described in detail for easily understanding the present invention. The embodiments are not necessarily limited to ones having all the described configurations. The configuration of an embodiment can also be replaced by the configuration of another embodiment. The configuration of another embodiment can also be added to the configuration of an embodiment. On a part of the configurations of the embodiments, another configuration can be added, removed, and replaced.

REFERENCE SIGNS LIST

1 . . . rotor
2 . . . stator
3 . . . air gap
4, 4a, 4b, 4c . . . internal air
5 . . . fan guide plate
6 . . . stator iron core
7 . . . inner fan
8 . . . stator frame
9 . . . stator coil
9A . . . stator coil end portion
10 . . . rotating shaft
11 . . . casing
12 . . . tube group
13 . . . outer fan
14, 14a, 14b . . . outside air
15a . . . outside air intake
16a . . . first outer fan duct outer plate
16b . . . second outer fan duct outer plate
17 . . . side plate
18 . . . upper plate
19 . . . lower plate
20 . . . outer fan mounting part cover
21 . . . outer fan mounting hole
22 . . . intermediate plate
23 . . . outside air introduction guide plate
24 . . . beam
26 . . . pipe-shaped beam
27 . . . plate-shaped beam
28 . . . ventilation hole
29 . . . outside air intake
30 . . . outside air intake net
31 . . . outer plate
32 . . . internal ventilation passage
33 . . . first ventilation path
34 . . . second ventilation path
100A, 100B . . . rotary electric machine
101 . . . rotary electric machine main body
102 . . . heat exchanger
103, 104 . . . outer fan duct

What is claimed is:

1. A rotary electric machine comprising:
a stator;
a rotor placed on an inner diameter side of the stator through an air gap, the rotor being fixed to a rotating shaft;
a stator frame configured to support the stator;
a casing configured to store the stator and the rotor;
an outer fan fixed to the rotating shaft
a heat exchanger installed above the casing, the heat exchanger being configured to exchange heat between outside air taken from an outside through the outer fan and internal air having cooled the stator and the rotor to remove heat; and
an outer fan duct installed on an end portion of the casing in an axial direction, the outer fan duct being provided with the outer fan in an inside of the outer fan duct, the outer fan duct being formed with a ventilation path through which the outside air is delivered to the heat exchanger,
wherein a plate-shaped member has at least a curved surface portion at which the outside air is introduced into the heat exchanger, and the plate-shaped member forms the ventilation path of the outer fan duct,
wherein an outside air introduction guide plate is installed in an inside of the ventilation path at a position near the heat exchanger, the outside air introduction guide plate being configured to guide the introduced outside air, and
the outside air introduction guide plate has a curved surface portion at which the outside air is introduced into the heat exchanger,
wherein the ventilation path of the outer fan duct is formed of
a first ventilation path located on a far side from the heat exchanger and
a second ventilation path located on a near side to the heat exchanger, the second ventilation path communicating with the first ventilation path;
the first ventilation path is partitioned from the second ventilation path by an intermediate plate having an opening; and
the second ventilation path has a curved surface portion at which the outside air is introduced into the heat exchanger.

2. The rotary electric machine according to claim 1, wherein the outside air introduction guide plate is installed in an inside of the second ventilation path.

3. The rotary electric machine according to claim 2, wherein the first ventilation path is formed of:
a first outer fan duct outer plate;
the intermediate plate;
a side plate placed on a side surface between the first outer fan duct outer plate and the intermediate plate;
an upper plate placed on an upper part of the first outer fan duct outer plate, the intermediate plate, and the side plate; and
a lower plate placed on a lower part of the first outer fan duct outer plate, the intermediate plate, and the side plate,
the second ventilation path is formed of:
a second outer fan duct outer plate;
the intermediate plate;
a side plate placed on a side surface between the second outer fan duct outer plate and the intermediate plate;
the upper plate placed on an upper part of the second outer fan duct outer plate, the intermediate plate, and the side plate; and
the lower plate placed on a lower part of the second outer fan duct outer plate, the intermediate plate, and the side plate;
the intermediate plate and the second outer fan duct outer plate have a curved surface portion at which the outside air is introduced into the heat exchanger, and
the first outer fan duct outer plate is formed with an outside air intake into which the outside air is taken.

4. The rotary electric machine according to claim 3, wherein the outside air intake is formed on the upper part of the first outer fan duct outer plate,
the second ventilation path communicates with the first ventilation path through the opening of the intermediate plate, and
the outside air is guided from the second ventilation path to the heat exchanger.

5. The rotary electric machine according to claim 4, wherein on the first ventilation path, a plate-shaped beam is installed on a space formed by the first outer fan duct outer plate, the intermediate plate, the upper plate, and the side plate,
the plate-shaped beam is formed with a ventilation hole, and
the outside air flows in an inside of the first ventilation path through the ventilation hole.

6. The rotary electric machine according to claim 5, wherein on the side plate located between the first outer fan duct outer plate and the intermediate plate and the side plate located between the second outer fan duct outer plate and the intermediate plate, a beam is installed, and
the beam includes a plurality of beams installed at regular intervals from a height near a lower end of the plate-shaped beam to downward.

7. The rotary electric machine according to claim 6, wherein the first outer fan duct outer plate is joined to the intermediate plate and the second outer fan duct outer plate is joined to the intermediate plate using a pipe-shaped beam or a columnar beam.

8. The rotary electric machine according to claim 7, wherein the rotating shaft extends penetrating a wall at end portion of the casing on the outer fan duct side and the second outer fan duct outer plate of the outer fan duct,
the outer fan is connected to a tip end of the rotating shaft, and
the outer fan is placed in the inside of the second ventilation path.

9. The rotary electric machine according to claim 1, wherein the ventilation path is formed of:
a first outer fan duct outer plate located on a far side from the heat exchanger;
a second outer fan duct outer plate located on a near side to the heat exchanger;
a side plate placed on a side surface between the first outer fan duct outer plate and the second outer fan duct outer plate;
a lower plate placed on a lower part of the first outer fan duct outer plate, the second outer fan duct outer plate, and the side plate, and
the second outer fan duct outer plate has a curved surface portion at which the outside air is introduced into the heat exchanger.

10. The rotary electric machine according to claim 9,
wherein the first outer fan duct outer plate is formed with an outer fan mounting hole, and
the outer fan mounting hole is blocked with an outer fan mounting hole cover.

11. The rotary electric machine according to claim 10,
wherein on the ventilation path, a plate-shaped beam is installed on a space formed by the first outer fan duct outer plate, the second outer fan duct outer plate, and the side plate,
the plate-shaped beam is formed with a ventilation hole, and
the outside air flows in the inside of the ventilation path through the ventilation hole.

12. The rotary electric machine according to claim 11,
wherein on the side plate located between the first outer fan duct outer plate and the second outer fan duct outer plate, a beam is installed, and
the beam includes a plurality of beams installed at regular intervals from a height near a lower end of the plate-shaped beam.

13. The rotary electric machine according to claim 12,
wherein the first outer fan duct outer plate is joined to the second outer fan duct outer plate using a pipe-shaped beam or a columnar beam.

\* \* \* \* \*